United States Patent [19]

Morales et al.

[11] Patent Number: 4,579,649

[45] Date of Patent: Apr. 1, 1986

[54] PROCESS FOR DEMETALLIZATION OF HEAVY CRUDES USING A CATALYST HAVING HIGH METAL RETENTION CAPACITY AND GOOD STABILITY

[75] Inventors: Alfredo L. Morales; Roberto E. Galiasso; Maria M. Agudelu; Jose A. Salazar; Angel R. Carrasquel, all of Los Teques, Venezuela

[73] Assignee: Intevep, S.A., Caracas, Venezuela

[21] Appl. No.: 718,509

[22] Filed: Apr. 1, 1985

Related U.S. Application Data

[62] Division of Ser. No. 563,197, Dec. 19, 1983, Pat. No. 4,520,128.

[51] Int. Cl.$^4$ .................. C10G 45/08; C10G 45/06
[52] U.S. Cl. ..................... 208/251 H; 208/111; 208/112; 208/216 R; 208/254 H
[58] Field of Search .............. 208/111, 112, 216 R, 208/251 H, 254 H; 502/208, 211, 212, 322

[56] References Cited

U.S. PATENT DOCUMENTS

| | | | |
|---|---|---|---|
| 4,309,278 | 1/1982 | Sawyer | 208/111 |
| 4,381,993 | 5/1983 | Neritt | 208/251 H |
| 4,411,824 | 10/1983 | Chen | 208/251 H |
| 4,497,704 | 2/1985 | O'Hara et al. | 208/111 |
| 4,500,424 | 2/1985 | Simpson et al. | 208/112 |
| 4,513,097 | 4/1985 | Angmorter et al. | 208/254 H |
| 4,520,128 | 5/1985 | Morales et al. | 208/112 |

*Primary Examiner*—Andrew H. Metz
*Assistant Examiner*—A. Pal
*Attorney, Agent, or Firm*—Bachman & LaPointe

[57] ABSTRACT

A new active stable catalyst for use in the removal of sulphur, nitrogen, contaminating metals, asphaltenes and Conradson carbon from heavy crudes and residues and, in particular, a method for the preparation of the catalyst and a process for the treatment of heavy crudes and residues with the catalyst. The catalyst comprises a hydrogenation component selected from Group VIB of the Periodic Table, a hydrogenation component selected from Group VIII of the Periodic Table and a phosphorus oxide component as active components all supported on an alumina carrier. The catalyst is made up of a dispersion of the above metals on the surface of the alumina carrier such that, when the catalyst is sulphided under specific conditions, catalytic activities such as hydrodesulphurization (HDS), hydrodenitrogenation (HDN) and hydrodemetallization (HDM) and the conversion of asphaltenes and Conradson carbon are improved. In addition, due to the phosphorus oxide, the catalyst does not contain aluminum oxides of the Group VIII and Group VIB metals which are undesirable compounds generally present in known catalysts.

3 Claims, 3 Drawing Figures

EFFECT OF PRESSUR ON THE HDS, HDV & HDN ACTIVITY IN P.S.I.G.

PROCESS FOR DEMETALLIZATION OF HEAVY CRUDES USING A CATALYST HAVING HIGH METAL RETENTION CAPACITY AND GOOD STABILITY

This is a division of application Ser. No. 563,197 filed Dec. 19, 1983, now U.S. Pat. No. 4,520,128.

BACKGROUND OF THE INVENTION

The present invention relates to a catalyst for use in the removal of sulphur, nitrogen, contaminating metals, asphaltenes and Conradson carbon from heavy crudes and residues and, more particularly, a method for the preparation of the catalyst and a process for the treatment of heavy crudes and residues with the catalyst.

The use of catalysts for the hydrotreatment of hydrocarbons of petroleum origin has been known for some time. Known processes are suitable for the reduction of the high metal content, the high asphaltene and Conradson carbon content, the high viscosity and the high sulphur and nitrogen contents of heavy crudes and residues. In addition, these processes are important since they facilitate an increase in yield of liquid fractions which are of greater commercial value.

High metallic contents in crudes and residues are very harmful in other petroleum refining processes, such as hydrocracking, hydrodesulphurization and catalytic cracking, since it poisons the catalysts, while the asphaltenes cause blocking of the catalyst bed thereby reducing its useful life, thus increasing the costs of operation.

The catalysts used in the hydrotreatment of heavy crudes and residues generally contain a metal from Group VIII of the Periodic Table of the elements, particularly cobalt or nickel, together with a metal from Group VIB of the Periodic Table, particularly molybdenum or tungsten. These metals are normally used in the form of oxides or sulphides and are supported on a carrier of a refractory oxide, generally gamma alumina.

Various methods have been reported for the preparation of catalysts and various processes disclosed for the improved hydrotreatment of heavy crudes and residues with catalysts.

U.S. Pat. No. 3,232,887 to Pessimis et al. discloses an aqueous solution of metals of Group VIB, stabilized with orthophosphoric acid for depositing on/or impregnating silica or alumina carriers. The presence of phosphorus in the catalyst obtained from this process increases the denitrogenation and desulphurization of the petroleum hydrocarbons. However, the patent fails to disclose a catalyst for nor does it give examples of application to heavy crudes and residues or of hydrodemetallization.

U.S. Pat. No. 3,649,523 to Bertolacini et al. discloses a catalytic composition formed by hydrogenation of a member of Group VIB and a metal selected from Group VIII of the Periodic Table of elements, supported on alumina with large pores. This catalyst is used for a hydrocracking process of heavy fractions. However, there is no disclosure drawn to the hydrotreatment of heavy crudes and residues having high metal contents.

U.S. Pat. Nos. 3,749,663, 3,755,150 and 3,755,196 to Mickelson disclose a catalytic formulation for the conversion of hydrocarbons and for desulphurization comprising a refractory oxide carrier impregnated with metals from Group VIB, Group VIII and phosphorus. The ratio by weight of $P/MoO_3$ is disclosed as between 0.1 and 0.5, so as to obtain an increase in hydrodesulphurization activity in hydrocarbons containing at least 100 ppm of sulphur. Mickelson does not disclose the P/Mo surface ratio for his catalyst. The weight ratio disclosed is not solely responsible for the catalyst activity observed.

U.S. Pat. No. 3,686,137 to Gatti discloses a catalyst for hydrogenation, desulphurization and denitrogenation of hydrocarbons. The catalyst is prepared by means of an aqueous solution of metals from Groups VIB and VIII stabilized with phorphoric acid. No examples are given in the patent for hydrodemetallization with such a catalyst.

U.S. Pat. No. 4,003,828 to Eberly Jr. discloses a process for removing metals and sulphur from heavy crudes and residues by using a catalyst which contains a hydrogenation component and an alumina carrier containing 1 to 16% by weight of phosphorus oxide as $P_2O_5$. The carrier is prepared by mixing a cogel of phosphorus oxide and alumina. This patent does not disclose a catalyst where the phosphorus oxide is incorporated in the carrier in the same stage as metal impregnation.

U.S. Pat. No. 4,317,746 to Richardson discloses a hydrotreatment catalyst formed from nickel, molybdenum and phosphorus as active components supported on alumina partially hydrated with water vapor. The catalyst is used for the desulphurization and denitrogenation of hydrocarbons. This catalyst is not disclosed as applicable to the hydrotreatment of heavy crudes and residues.

Accordingly, it is the principal object of the present invention to provide an improved catalyst for use in the hydrotreatment of heavy crudes and residues.

It is a particular object of the present invention to provide an improved catalyst for use in the hydrotreatment of heavy crudes and residues characterized by improved catalytic activities such as hydrodesulphurization, hydrodenitrogenation, hydrodemetallization and the conversion of asphaltenes and Conradson carbon.

It is a further object of the present invention to provide a method for the preparation of a catalyst used in the hydrotreatment of heavy crudes and residues.

It is a still further object of the present invention to provide a process for the treatment of heavy crudes and residues with a catalyst.

Further objects and advantages will appear hereinbelow.

SUMMARY OF THE INVENTION

In accordance with the present invention the foregoing objects and advantages are readily obtained.

The present invention relates to an active stable catalyst for use in the removal of sulphur, nitrogen, contaminating metals, asphaltenes and Conradson carbon from heavy crudes and residues and, in particular, a method for the preparation of the catalyst and a process for the treatment of heavy crudes and residues with the catalyst.

The catalyst comprises a hydrogenation component selected from Group VIB(X) of the Periodic Table as, for example, molybdenum, a hydrogenation component selected from Group VIII(Y) of the Periodic Table as, for example, nickel or cobalt, and a phosphorus oxide component as the active components all supported on an alumina carrier. The surface phosphorus confers on the catalyst the property of dispersing the above metals, for example, nickel and molybdenum, on the surface of the alumina carrier of the catalyst such that, when the catalyst is sulphided under certain conditions, the techniques of X-Ray Photoelectronic Spectroscopy (XPS) gives values of $Ys/(Al+Y)_s$ of between 0.7 to 6.0, $Xs/(Al+X)_s$ of between 3.0 to 9.7 and $Ps/(Al+P)_s$ of between 6.0 and 9.2 where X is molybdenum and Y is nickel. In the case of a catalyst prepared from molybdenum and cobalt, the surface metal ratios shall be maintained in the same order of magnitude as set forth above with respect to molybdenum and nickel. XPS techniques would give the following values: $Ys/(Al+Y)_s$ between 0.5 to 4.2; $Xs/(Al+X)_s$ of between 2.8 to 9.7 and $Ps/(Al+P)_s$ of between 5.0 to 9.2 where X is molybdenum and Y is cobalt. The phosphorus oxide added to the composition of the catalyst avoids the formation of undesirable compounds of the type $NiAl_2O_4$, $CoAl_2O_4$, $Al_2(moO_4)_3$ and $MoO_3$ in quantity if the catalyst formulation which is desired is of the type $NiMo/Al_2O_4$ or of the type $CoMo/Al_2O_3$. It also decreases the formation of coke when the catalyst is used in the hydrotreatment of heavy crudes and residues.

The high concentration of surface metals and the high capacity for surface sulphiding and exchange with the surface of the alumina across phosporus bridges is responsible for the improved catalytic activity in HDS, HDN, HDM and the asphaltene and Conradson carbon conversion of the catalyst of the present invention in spite of operating at moderate pressures thereby resulting in considerable economic gains. Also, as noted above the new catalyst produces less coke than known catalysts which gives it further advantages. The catalysts high stability, longer life (greater than 10 months) and its high ability to store metals (greater than 90% by weight) in fixed-bed reactors is due to its excellent pore size distribution which is in the range of 60 to 300 Å diameter and is equivalent to 90% total porosity.

In order to prepare a catalyst having the dispersion of surface metals and catalytic characteristics as set forth above, a special procedure has to be carried out in the preparation of the catalyst which consists of adding the phosphorus oxide to the aqueous solution of Group VIB and Group VIII metals in stoichiometric quantities with reference to the Group VIB metal. For example, to an aqueous molybdenum and nickel solution, the phosphorus oxide is added in stoichiometric quantities with respect to the molybdenum. The pH of the solution should be between 1 and 2 respectively. This procedure confers on the catalyst of the present invention the special chemical properties useful for use in the processing of heavy crudes and residues.

A further objective of the present invention resides in a process for the hydrotreatment of heavy crudes and residues which consists of placing the heavy crudes and residues in a reaction zone, under specific operating conditions in the presence of hydrogen with the catalyst of the present invention. The operating conditions consist of a temperature of between 350° and 430° C., a hydrogen pressure of between 1000 and 3000 psig; a liquid hourly space velocity, LHSV, of between 0.2 and 2 volumes of heavy hydrocarbon or residue per hour per volume of catalyst and a hydrogen flow rate of between 1000 and 10,000 standard cubic feet of hydrogen per barrel of hydrocarbon (SCFB).

DETAILED DESCRIPTION

Figure 1:
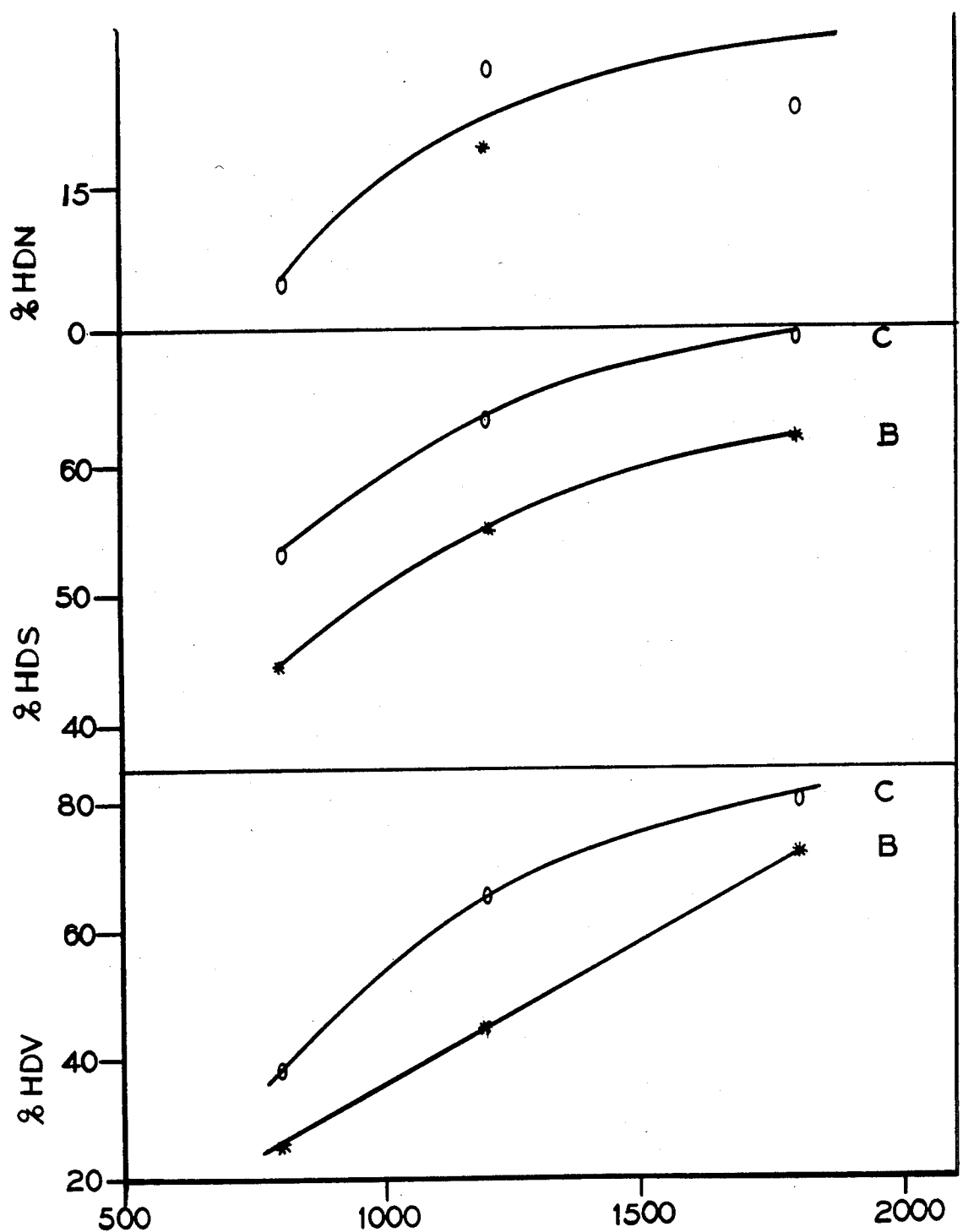
FIG. 1 is a graph illustrating the effect of pressure on the catalyst of the present invention compared to a prior art catalyst on HDS, HDV and HDN activity.

The present invention resides in a new catalyst for the hydrotreatment of heavy crudes and residues. The new catalyst can hydrotreat heavy loads with metal contents greater than 1000 parts per million of vanadium, nickel and iron; concentrations as high as 5% of sulphur; 7000 ppm of nitrogen and up to 25% of asphaltenes.

The catalyst of the present invention is prepared from a hydrogenation component selected from Group VIB of the Periodic Table, at least one metallic component selected from Group VIII of the Periodic Table and phosphorus oxide. All these components are deposited on an alumina support or carrier, the latter having special physical and chemical properties to meet certain specifications. The impregnation stage is carried out on this support or carrier so as to deposit thereon the active catalytic materials.

During the impregnation stage, the present invention makes use of co-impregnation. In this method the alumina carrier is placed in contact with an aqueous solution which contains all the active principles, that is, the Group VIB component, the Group VIII component and the phosphorus oxide component, then it is passed to the drying and calcination stage so as to obtain the final catalyst in an oxidized form.

The gamma alumina carrier, in extruded form, in pellets or in spheres, but preferably extruded in sizes between 1/32 and ⅛ of an inch, preferably in sizes between 1/32 and 1/16 of an inch; said alumina having a surface area between 120 and 400 square meters per gram, but preferably between 150 and 250 square meters per gram; having a total pore volume between 0.5 and 1.2 cc/g, preferably between 0.7 and 1.00 cc/g, having between 60 and 100% of the total pore volume as pores with a diameter of between 60 and 300 Angstroms, preferably between 70 and 90% of the total pore volume as pores with a diameter between 90 and 300 Angstroms, so as to attain the maximum interconnection between the mesopores and the macropores of the carrier or support. A mesoporous support is defined as one with pores between 20 and 500 Angstroms in diameter, and a macroporous support as one with pores greater than 500 Angstroms in diameter. (Adsorption, Surface Area and Porosity, S. Gregg and K. S. W. Sing; Page 25, Second Edition, Academic Press, 1982). The resistance of the bed made from the new catalyst should be between 4 and 15 kg/cm$^2$, preferably 5 and 10 kg/cm$^2$.

The gamma alumina support or carrier with special properties set forth above is placed for a time of between 5 and 25 minutes, preferably between 10 and 20 minutes, in contact with an aqueous solution containing ammonium molybdate, ammonium paramolybdate, ammonium oxalate, ammonium pentachloride (sic) or a soluble salt corresponding to any other metal of Group VIB which one wishes to deposit so as to obtain a composition containing 5 to 30% by weight of the oxide of molybdenum (or other metal of Group VIB), preferably 5 to 20% by weight based on the dry weight of the catalyst. The aqueous solution also contains the nitrate of nickel (or other metal from Group VIII of the Periodic Table) so as to obtain a composition of between 0.1 and 8.0% by weight of the oxide of nickel (or other metal from Group VIII of the Periodic Table), preferably 1 to 5% by weight based on the dry weight of the catalyst. The aforementioned aqueous solution is stabilized with phosphoric acid or ammonium acid phosphate in a stoichiometric quantity with reference to the molybdenum salt (or other metal of Group VIB of the Periodic Table) so as to obtain a composition of between 5 and 30% by weight, preferably 5 to 20% by weight, of phosphorus oxide, expressed as $P_2O_5$ and based on the dry weight of the catalyst. In all cases the pH of the solution must be maintained between 1 and 2.

After the specified time for impregnation has passed, the catalyst with the deposited active materials is filtered, dried in an air circulation oven for 24 hours at a temperature of between 25° and 150° C., preferably 30° and 70° C. at atmospheric pressure, and finally calcined at a temperature of between 400° and 600° C., preferably 500° and 580° C. for a period of 1 to 24 hours using a volume of 4 to 10 cubic meters of air per hour and per kilogram of catalyst at atmospheric pressure. These sequential stages enable one to obtain the catalyst in an oxidized state.

The presulphiding of the oxidized catalyst is carried out under controlled conditions with the purpose of not destroying the dispersion of the hydrogenating metals and to obtain maximum efficiency. The preferred presulphiding conditions are as follows: the pressure should be between 200 and 600 psig, the temperature may vary between 230° and 360° C. with a controlled increase in temperature not greater than 20° C./h, the space velocity should be between 1 and 3 $m^3/m^3$ h using an atmospheric gasoil containing 2% sulphur by weight added as carbon disulphide. The optimum time for presulphuration should be between 8 and 11 hours.

Presulphiding can also be carried out by replacing atmospheric gasoil containing 2% sulphur by weight added as carbon disulphide with a $H_2/H_2S$ mixture (preferably between 10 and 15% by volume of $H_2S$). In this case it is preferred to carry out the presulphiding at atmospheric pressure but maintaining the same temperature and space velocity as in the previous procedure.

The catalyst of the present invention has the following physical and chemical properties. The surface area is between 120 and 400 $m^2/g$, preferably between 150 and 250 $m^2/g$; the total pore volume is between 0.5 and 1.2 cc/g, preferably between 0.7 and 1.0 cc/g; 60 to 100% of the total pore volume should be comprised of pores of between 60 and 300 Angstroms in diameter, preferably 70 to 90% of the total pore volume should be comprised of pores of between 90 and 300 Angstroms in diameter. The size of the extrudate should preferably be between 1/32 and 1/16 inches in diameter and in lengths of between 1 and 3 mm. The resistance of the bed made from the new catalyst should be between 4 and 15 $kg/cm^2$, preferably between 5 and 10 $kg/cm^2$.

The catalyst of the present invention emits signals by XPS (X-Ray Photoelectronic Spectroscopy). These signals enable the amount of metals present in the catalyst surface to be determined and calculated. It is the presence of these metals on the surface of the catalyst which are responsible for the improved catalytic activity observed with the catalyst. The XPS technique consists of exciting the atoms of the material by means of X-rays and measuring the energy spectrum of the electrons emitted by photo-emission. As the X-rays penetrate only a few Angstroms of material, the spectrum obtained is a measure of the quantity of the metal present on the surface of the catalyst.

These studies were carried out using surface analysis equipment type Leybold LHS-10, which consists of a source of X-rays, an energy analyzer and a detector system. The conditions for the surface analysis were as follows: Radiation $h\nu = 1253.6$ eV supplied by a magnesium cathode (Mg K) taking 300 volts and an energy stage of 50 eV. Carbon (1s, 285 eV) and aluminum (2p, 74.8 eV) were taken as standards for calculating the bonding energies. The surface dispersion of the metals was determined by measuring the total area for the molybdenum doublet (3d, 3/2-5/2), from the peak corresponding to nickel (2p) to that corresponding to phosphorus (2p) and dividing both of them into the area of the peak corresponding to aluminum (2p) plus the peak of the metal which one wishes to determine.

The preferred metallic surface dispersions for molybdenum and nickel of the new oxide catalyst prepared in accordance with the present invention, as obtained by XPS, are as follows. $Ni_s/(Al+Ni)_s$ between 0.7 and 6.0; $Mo_s/(Al+Mo)_s$ between 3.0 and 9.7; and $P_s/(Al+P)_s$ between 6.0 and 9.2, respectively. The catalyst does not show bands at 612 and 575 nm when examined by the technique of UV-visible diffuse reflectance, which demonstrates that the catalyst does not contain tetrahedric $Ni^{+2}$, that is to say that it does not form the undesirable spinel $NiAl_2O_4$ which is generally present in catalysts of prior art. The preferred metallic surface dispersions for molybdenum and cobalt of the new oxide catalysts obtained by XPS are as follows: $Co_s/(Al+Co)_s$ between 0.5 to 4.2, $Mo_s/(Al+Mo)_s$ between 2.8 and 9.7 and $P_s/(Al+P)_s$ between 5.0 to 9.2.

The catalyst when examined by Raman spectroscopy shows no bands present at 1000 and 830 $cm^{-1}$ nor at 1010 and 360 $cm^{-1}$ which correspond to the undesirable compounds $MoO_3$ in mass and to $Al_2(MoO_4)_3$, which are generally present in catalysts of prior art.

The sulphiding of the catalyst should be carried out under narrowly controlled conditions so as not to disturb the dispersion of the nickel and the molybdenum. A temperature range of 230° to 360° C., preferably in the range 250° to 350° C., atmospheric or higher pressures, and the use of elemental sulphur or compounds of sulphur, such as mercaptans, thiophene, carbon disulphide or mixtures of $H_2/H_2S$, are the conditions preferred for the presulphiding of the catalyst. After presulphiding the preferred dispersion of the sulphided metals in the surface of the catalyst, as determined by XPS, should be as follows:

$(Ni_{sulph})_s/(Al+Ni_{sulph})_s$: between 0.7 and 5.8
$(Mo_{sulph})_s/(Al+Mo_{sulph})_s$: between 3.1 and 10.0 and
$(P_{sulph})_s/(Al+P_{sulph})_s$: between 5.8 and 9.7.

The improvement over prior art of the catalyst of the present invention for the hydrotreatment of heavy crudes and residues is based on its surface properties by means of which good catalytic activity is obtained which results in excellent HDS, HDN and HDM activity, conversion of asphaltenes and Conradson carbon. Moreover, because of its physical and chemicl properties, the catalyst possesses very good stability during its working life and is able to accumulate metals homogeneously by means of its catalyst particles, taking up to more than 90% by weight of the contaminating metals vanadium and nickel. Since this catalyst forms less coke on its surface than catalysts in the prior art, it is an important alternative in refining processes for heavy crudes and residues since it can be used either in a conventional fixed bed reactor or in a fluid bed reactor.

To establish the effectiveness of the new catalyst which is the subject of the invention, in the hydrotreatment of heavy crudes and residues, loads have been used which have a high content of metals such as vanadium, nickel and iron, as well as high sulphur, nitrogen and Conradson carbon contents. In the present invention, Venezuelan heavy crudes and residues, from the Orinoco Petroleum Zone, were employed as loads or charges.

These heavy crudes and residues were submitted to hydrotreatment using the catalyst of the invention in a fixed bed reactor with an internal diameter of 2.5 cm taking a charge of 370 grams of catalyst giving an overall bed length of 77 cm. The preferred conditions for the process are as follows: Temperature between 350° and 450° C., preferably 360° and 430° C., hydrogen at a pressure between 500 and 3000 psig, preferably 600 and 3000 psig, a load flow to catalyst volume ratio of between 0.1 and 5 volumes per hour of load per volume of catalyst, and a hydrogen throughput of 500 to 20,000 standard cubic feet per barrel of feed, preferably 1000 to 10,000 standard cubic feet per barrel of feed (SCFB).

The effectiveness of the present invention is illustrated by the following examples.

EXAMPLE I

Four catalysts were prepared and used for comparative trials, these being a catalyst from prior art (A); a catalyst prepared in the same way as (A) but not containing phosphorus in its composition and identified as (B); a catalyst prepared in accordance with the present invention and identified as (C); and finally a catalyst identified as (D) which was prepared in accordance with the present invention, but having a pore size distribution displaced towards a pore size greater than 1000 Angstroms. Table I below shows the physical and chemical properties of the catalysts.

TABLE I

PREFERRED PHYSICAL AND CHEMICAL PROPERTIES OF VARIOUS CATALYSTS

| Properties | CATALYSTS | | | |
|---|---|---|---|---|
| | A | B | C | D |
| $Ni_s/(Al + Ni)_s$ | 5.9 | 0.94 | 1.65 | 1.65 |
| $Mo_s/(Al + Mo)_s$ | 3.5 | 3.95 | 4.91 | 5.20 |
| $P_s/(Al + P)_s$ | — | — | 7.79 | 8.10 |
| Surface area, $m^2/g$ | 285 | 210 | 190 | 292 |
| Pore volume, cc/g | 0.64 | 0.80 | 0.73 | 1.06 |
| Mean pore diameter, Å | 77 | 152 | 154 | 145 |
| Bed resistance, $kg/cm^2$ | 10.3 | 4.5 | 6.4 | — |

TABLE I-continued

PREFERRED PHYSICAL AND CHEMICAL PROPERTIES OF VARIOUS CATALYSTS

| Properties | CATALYSTS | | | |
|---|---|---|---|---|
| | A | B | C | D |
| Particle size, inches | 1/16 | 1/32 | 1/32 | 1/16 |
| Pore Size Distribution, % V DIAMETER | | | | |
| 20–30 Å | 2.8 | 0.0 | 0.0 | 0.0 |
| 30–60 Å | 40.3 | 1.0 | 0.0 | 2.94 |
| 60–90 Å | 51.6 | 3.0 | 3.0 | 37.25 |
| 90–150 Å | 6.3 | 40.0 | 42.0 | 11.76 |
| 150–300 Å | 1.6 | 53.0 | 53.0 | 8.82 |
| 300–$10^3$ Å | 0.0 | 2.0 | 2.0 | 6.86 |
| >$10^3$ Å | 0.0 | 0.0 | 0.0 | 32.35 |

The tests on the catalytic activity of the aforementioned catalysts in the hydrotreatment of heavy crudes and residues were carried out using Cerro Negro crude, the properties of which are summarized in Table II, below:

TABLE II

CHARACTERISTICS OF THE CHARGES USED IN THIS INVENTION

| Properties | Whole Crude Cerro Negro | Residual 350° C.+ Cerro Negro |
|---|---|---|
| API Gravity | 12.4 | 5.2 |
| Viscosity Cst, 140° F. | 540 | 3500 |
| Conradson carbon % by weight | 11.0 | 17.1 |
| Asphaltenes % by weight | 8.0 | 12.1 |
| Sulphur % by weight | 3.32 | 4.53 |
| Nitrogen ppm | 5550 | 7700 |
| Vanadium ppm | 400 | 535 |
| Nickel ppm | 73 | — |

The process conditions were as follows: T=400° C., P=1800 psig, LHSV=1 $m^3 \cdot m^{-3} \cdot h^{-1}$ and ratio $H_2$/feed=1000 $Nm^3/m^3$. The time used for catalysts screening was 8 days.

Table III shows the results obtained with catalysts A, B, C and D.

TABLE III

CHARACTERISTICS OF THE PRODUCTS OBTAINED WITH THE CATALYSTS IN EXAMPLE I

| Properties | CATALYSTS | | | |
|---|---|---|---|---|
| | A* | B** | C** | D* |
| Vanadium, ppm (% HDV) | 284 (29.1) | 171 (70.2) | 120 (79.2) | 90 (77.5) |
| Sulphur % (HDS) | 1.82 (45.3) | 1.75 (61.4) | 1.30 (71.3) | 1.79 (45.8) |
| Nitrogen ppm (HDN) | 4973 (10.4) | 5947 (21.5) | 5133 (32.2) | 4684 (15.6) |
| Asphaltenes % by weight | 7.3 | 4.43 | 4.26 | 7.8 |
| Conradson carbon % by weight | 6.2 | 10.5 | 9.18 | 5.6 |

Products obtained at T = 400° C., P = 1800 psig, LHSV = 1 $h^{-1}$ and 8 days running.
*Load = whole Cerro Negro crude
**Load = Cerro Negro Residual 350° C.+

Catalysts B, C and D show a substantial increase in the HDS, HDV and HDN catalytic activities and in the conversion of asphaltenes and Conradson carbon over catalyst A. Catalyst D, which has a very different pore size distribution to catalysts B and C, shows a much lower HDS and HDN activity, which indicates that the optimum pore size distribution is where the greatest total pore volume is for a pore size where the diameter is between 90 and 300 Angstroms.

EXAMPLE II

Figure 2:
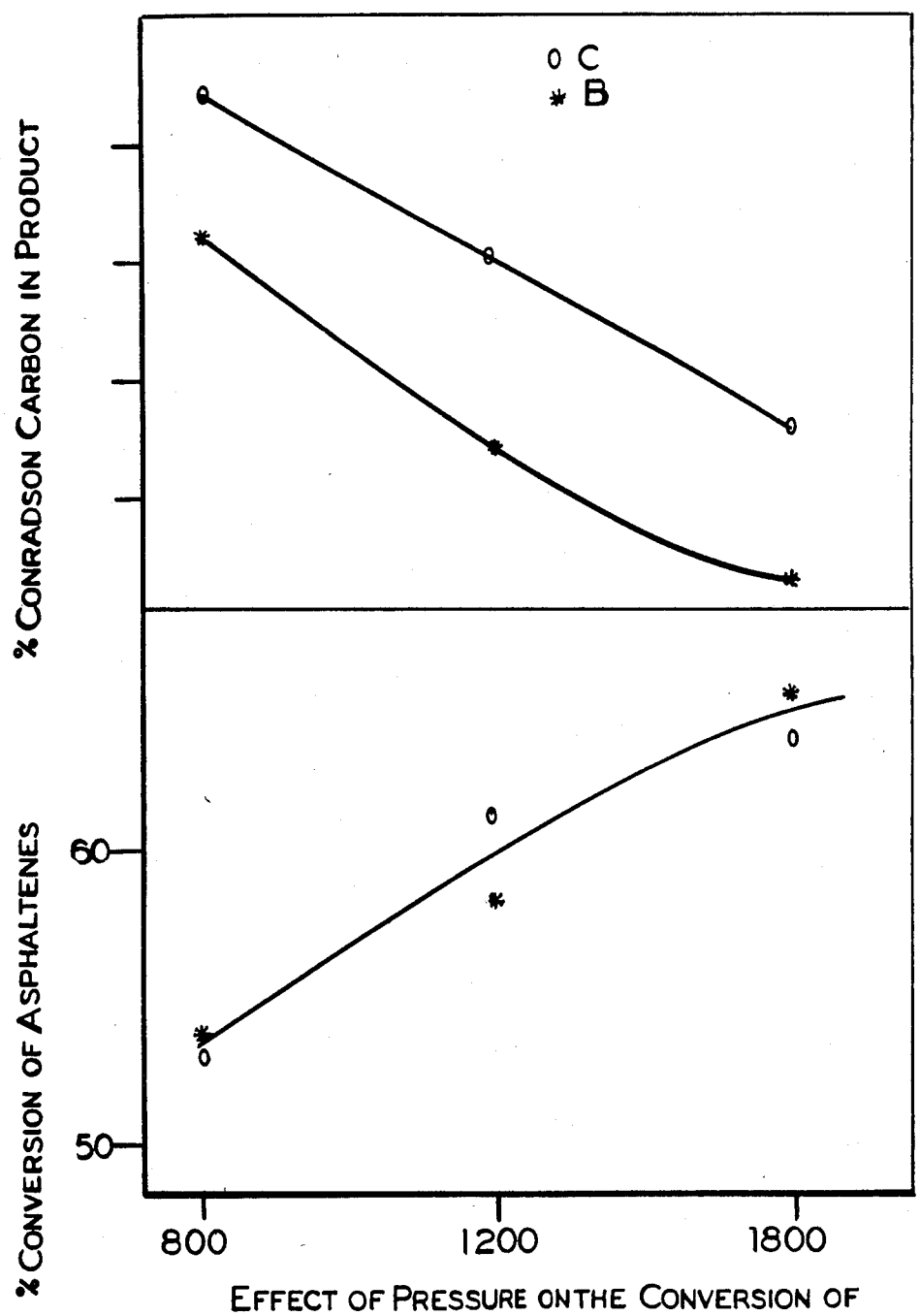
FIG. 2 is a graph illustrating the effect of pressure on the catalyst of the present invention compared to a prior art catalyst on the conversion of asphaltenes and Conradson carbon.

Various comparative experiments were carried out with catalysts B and C using various operating conditions to study the behavior of the two catalysts. In FIGS. 1 and 2, results are shown for the HDS, HDV, HDN and conversion of asphaltenes and Conradson carbon in relation to hydrogen pressure and maintaining a constant temperature of 400° C., an LHSV of 1 $m^3 \cdot m^{-3} \cdot h^{-1}$ and using a 350° C.+ residue from Cerro Negro crude. It is evident from the results obtained that catalyst C is the most effective in the hydrotreatment of heavy crudes since it has higher catalytic activity than catalyst B and can operate at lower pressures. In Table IV, below, it may be observed that catalyst C gives less coke than catalyst B, which is an additional advantage in the hydrotreatment of heavy crudes and residues.

TABLE IV

COKE FORMATION CAPACITY USING CATALYSTS B AND C

| | CATALYSTS | |
|---|---|---|
| | B | C |
| Coke formed on catalyst % by weight | 14.3 | 9.0 |

T=400° C., P-1800 psig, LHSV=1 $h^{-1}$, Load=- Residual 350° C.+ Cerro Negro

EXAMPLE III

Figure 3:
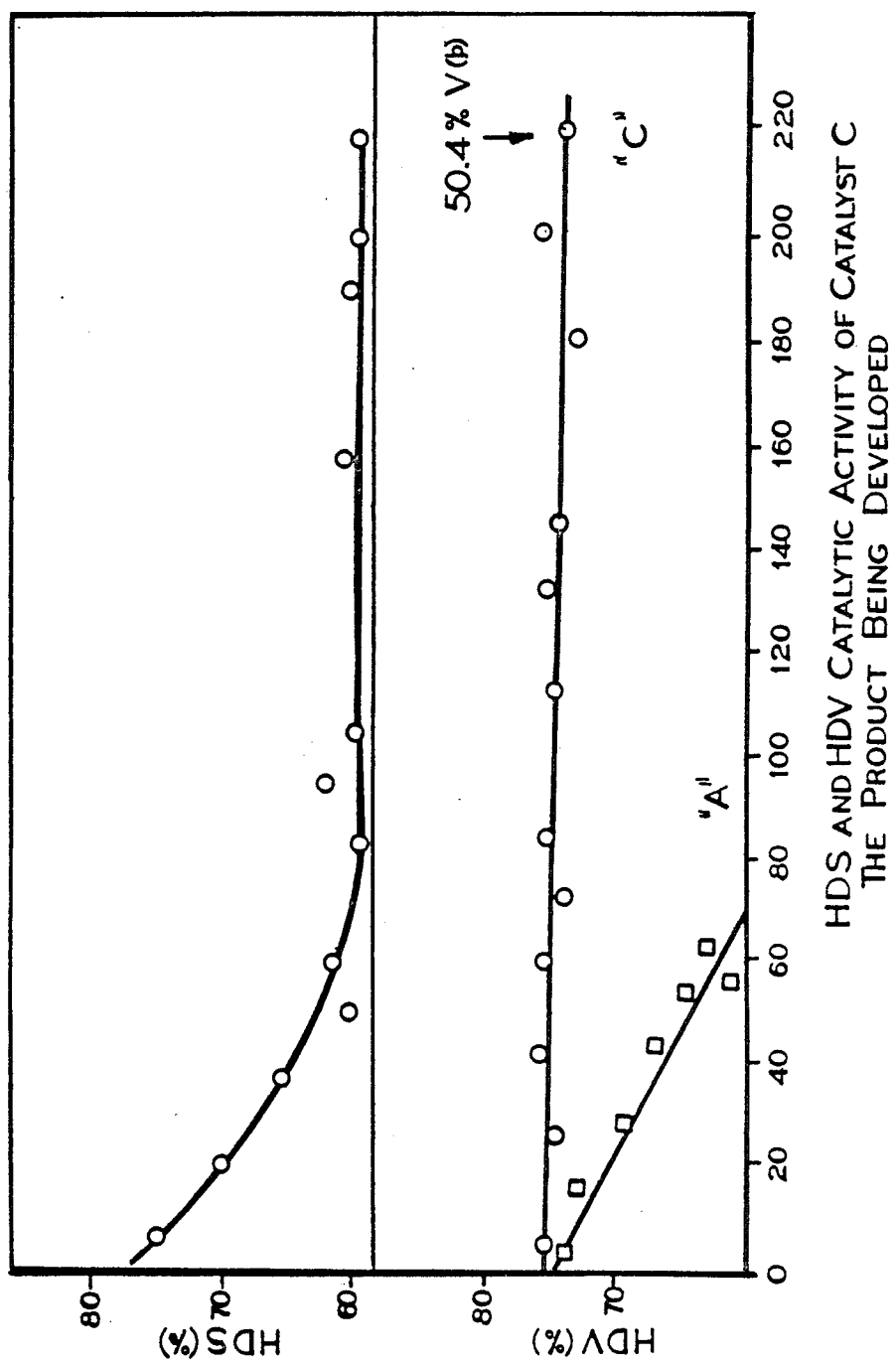
FIG. 3 is a graph illustrating the HDS and HDV catalytic activity of the catalyst of the present invention.

Catalysts A and C from Example I were examined to find their useful life when processing heavy crude. The long life test conditions were as follows: Temperature: 400° C., P=1800 psig, LHSV=0.35 $m^3 \cdot m^{-3} \cdot h^{-1}$ using whole Cerro Negro crude as a charge. The HDV and HDS activities for catalyst C are shown in FIG. 3 and also the HDV activity for catalyst A. It may be seen that the new catalyst remains stable for more than 220 days, while catalyst A fails irreversibly after 70 operating days.

As a comparison, Table V below shows the estimated life, the storage capacity for contaminating metals and the number of barrels of heavy crude or residue that may be processed per pound of catalyst, for catalysts A and C.

TABLE V

PARAMETERS IN THE EVALUATION OF CATALYST C WHICH IS THE SUBJECT OF THE PATENT

| | CATALYSTS | |
|---|---|---|
| Parameters | A | C |
| Length of life in months | 2 | 11 |
| Metal storage capacity % by weight | 10 | 90 |

TABLE V-continued

PARAMETERS IN THE EVALUATION OF CATALYST C WHICH IS THE SUBJECT OF THE PATENT

| | CATALYSTS | |
|---|---|---|
| Parameters | A | C |
| Processing capacity barrels/lb | 5.2 | 36 |

Without doubt, the newly developed catalyst is an attractive alternative to conventional catalysts when used for the hydrotreatment of heavy crudes and residues.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the hydrotreatment of heavy crudes and residues containing high levels of metals, sulphur, asphaltenes and Conradson carbon comprising providing a catalyst formed by impregnating an alumina carrier in an aqueous solution containing a component selected from the metallic elements of Group VIB of the Periodic Table, a component selected from the metallic elements of Group VIII of the Periodic Table and a phosphorus oxide component and contacting the heavy crude with said catalyst in a hydrotreatment zone in the presence of hydrogen so as to convert said heavy crude into a light hydrocarbon wherein said phosphorus oxide is added in substantially stoichiometric quantities with respect to the metallic elements of Group VIB of the Periodic Table such that the ratio of phosphorus oxide to the oxide of the metallic elements of Group VIB on the surface of the catalyst is substantially unity, said catalyst having a surface area of between 120 to 400 $m^2/g$ and a total pore volume of between 0.5 to 1.2 cc/g wherein between 60 and 100% of the total pore volume comprises pores having a diameter of between 60 to 300 Å.

2. A process according to claim 1 including the steps of operating said hydrotreatment zone at a temperature of from 350° to 450° C. at a hydrogen pressure of from about 500 to 3000 psig, a liquid hourly space velocity of from about 0.10 to 5 volumes of crude per hour per volume of catalyst and a hydrogen flow of from about 500 to 20,000 $ft^3$/barrel of heavy crude.

3. A process according to claim 2 including the steps of providing a heavy crude having a nickel content of more than 50 ppm, a vanadium content of more than 50 ppm, a sulphur content of more than 1.5%, a nitrogen content of more than 800 ppm, an asphaltene content of more than 4% and a Conradson carbon content of more than 5%.

* * * * *